United States Patent Office 3,814,581
Patented June 4, 1974

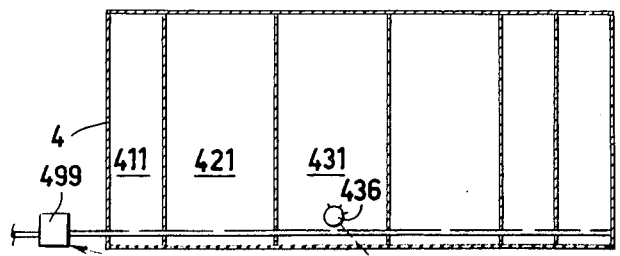
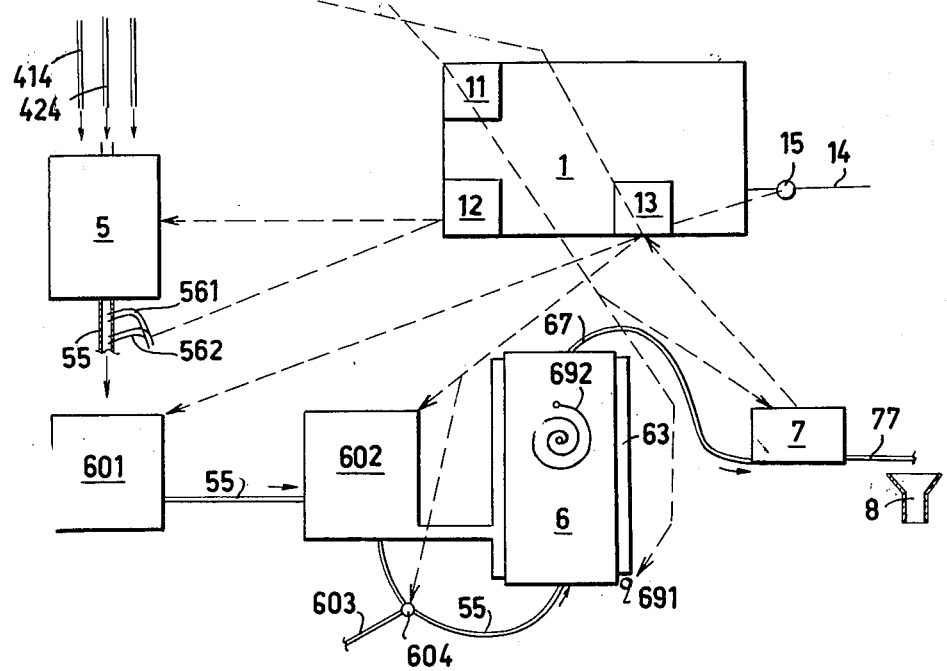
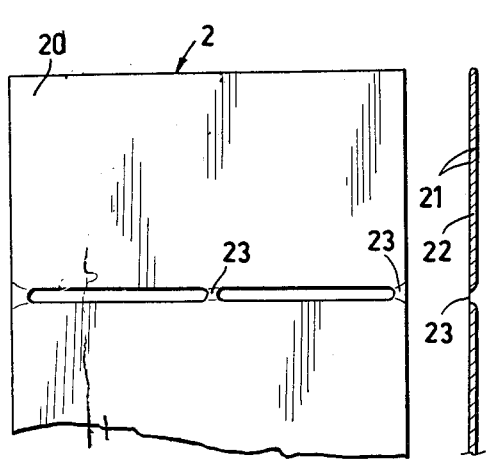
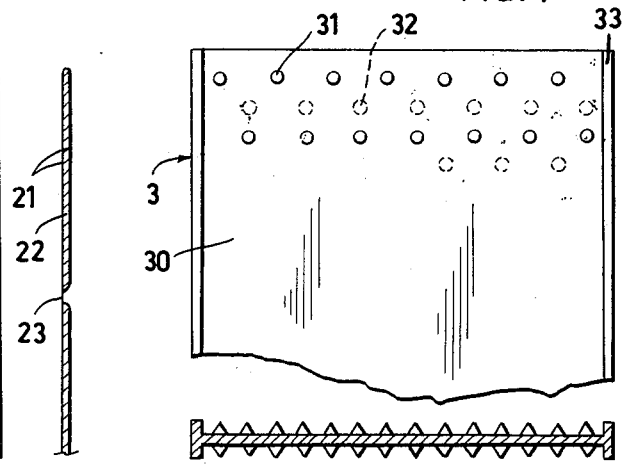
FIG. 1
FIG. 2
FIG. 3
FIG. 4
FIG. 5

3,814,581
METHOD AND APPARATUS FOR REMOVING UNDESIRABLE SOLUBLE SUBSTANCES FROM CHEMICAL COMPOSITIONS
Matti Reunanen, Kupittaankatu 11–13 C 38, Turku, Finland
Filed Mar. 19, 1971, Ser. No. 125,989
Claims priority, application Finland, Mar. 20, 1970, 801/70
Int. Cl. B01j 1/22; G01n 31/06, 33/16
U.S. Cl. 23—230 R    11 Claims

ABSTRACT OF THE DISCLOSURE

A method and an apparatus for washing molecules that are to be fixed in a medium clean of undesirable soluble molecules, whereby the desired compound is absorbed into the medium. Sample medium plates containing the desired compound are then rinsed with wash solutions in a wash tank and the wash solutions are removed by means of gas blown through the tank.

---

This invention relates to a method and apparatus for washing molecules that are to be fixed in a medium clean of soluble molecules, whereby the desired compound is absorbed into the medium and, for instance, precipitated therein.

This invention relates also to an apparatus with which a great amount of samples can simultaneously and similarly be completely automatically washed clean of undesired substances by fixing the desired substances in a spongy medium and by directing a constant flow of liquid in touch with these, the nonfixed substance being washed away with the liquid flow. The apparatus is suitable for preparation of samples for radioactive measuring, and it is particularly suited to the investigation of macromolecular synthesis. For example, the reaction mixture is absorbed into the medium and the macromolecules (proteins, nucleic acids or amino acid-transfer ribonucleic acid complex) are precipitated with acid, while the micromolecular substances remain soluble and wash away during the wash. The speed of synthesis may be determined by measuring the radioactivity left in the medium, when the parent substance contains a labelled atom.

Previously there have been various methods of removing parent substances, for example: the macromolecules are precipitated in a test tube and the micromolecular substances are washed away from the precipitate by suspending it after centrifugation in new wash solutions for 6–10 times; the precipitate that is obtained by the addition of an acid is washed by means of filters by pouring new wash solutions several times on the precipitate after the old solution has oozed through; the sample is absorbed into a filtering tissue, and after treatment with an acid this is carried with pincers from one wash vessel to another; also dialysis is used. The difficulty with these methods is that they demand active participation and each sample has to be dealt with individually, because of which the efficiency of the wash varies.

The purpose of the present invention is to remove these disadvantages. Each sample is to have similar treatment and the active participation is diminished into mere starting of the machine. In addition, the samples are in a solid state, which facilitates the further treatment: carbon-14 for example can be counted directly and the tritium sample after sample oxidizing determined.

Further advantages are the carefulness and homogeneity of the wash.

The method according to the invention is substantially characterized by the fact that sample medium plates are placed at a certain distance from each other in a wash tank and are rinsed with at least one wash solution into which the removable substance dissolves, and that the last wash liquid is removed by blowing gas through the wash solution tank, after which the dry plates of sample medium that contain the desired molecule can be removed for treatment.

The apparatus according to the invention is substantially characterized by the fact that it consists of a liquid tank which is divided into several vessels for several various wash liquids and is in contact with a wash tank through a valve, a pump and a thermostat, and that there is a control unit for the co-ordination of different functions.

The invention is described below more in detail, and it is adapted to protein biosynthesis investigations. However, the apparatus is suited to all such systems with which the molecule to be measured can be kept in the sample medium and the removable substance dissolved in the wash liquid. Thus it is possible, if desired, for example, to remove the hydrophilic substances out of fat by letting the sample absorb into the hydrophobic medum and to wash it with water.

Likewise the iron binding capacity of blood can be determined by mixing a serum sample with radioactive iron and absorbing the mixture into a paper containing magnesium carbonate, whereby the radioactive iron bonded to protein can be removed by washing with a solution of water and salt and the non-bonded iron remains in the paper and can be counted with radioactive techniques.

The invention is described referring to the enclosed drawings.

FIG. 1 shows the general arrangement of the apparatus according to the invention.

FIG. 2 shows part of the sample medium plate from above.

FIG. 3 shows the part of the FIG. 2 of the sample medium plate in profile.

FIG. 4 shows the intermediate plate from above.

FIG. 5 shows the intermediate plate of the FIG. 4 from the end.

Figures 7, 8:
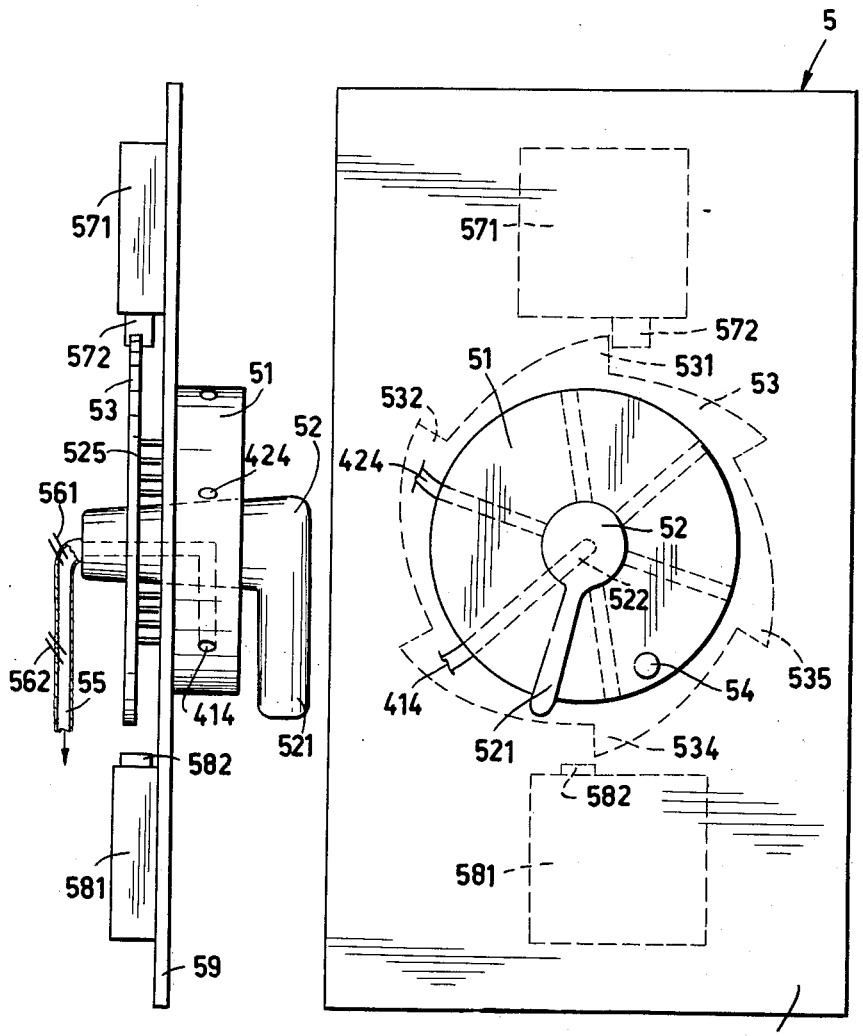
FIG. 7 shows the valve according to the invention from above.
FIG. 8 shows the valve of the FIG. 7 in profile.

The reaction mixture is absorbed into a sample medium 2 (FIG. 2), which consists of different components 20, of which there is one for each sample. To make the treatment easier the components form a long strip so that a thin, tough filament 23 that does not absorb liquid connects them. The inner part 22 of the component is spongy and absorbs great amounts of liquid and the surface part 21 is compact in order to prevent the macromolecules from escaping after absorption. After the absorption the treatment varies: if it is desired to investigate the synthesizing of proteins, the medium components are sprayed with a base which breaks the amino acid-transfer ribonucleic acid complexes, and after that the base is precipitated with acid; if it is wanted to investigate attaching of amino acid to transfer ribonucleic acid, the precipitating is done directly with acid. After this the sample medium plates are spread between separating intermediate plates 3. Conical consoles 31 and 32 of the plates prevent the immediate contact with plate 30, and edge ridges 33 prevent the plates from collapsing against each other. Thus free space is left between sample components 20 and the intermediate plates 30, in which space the wash liquid can flow.

Figure 9:
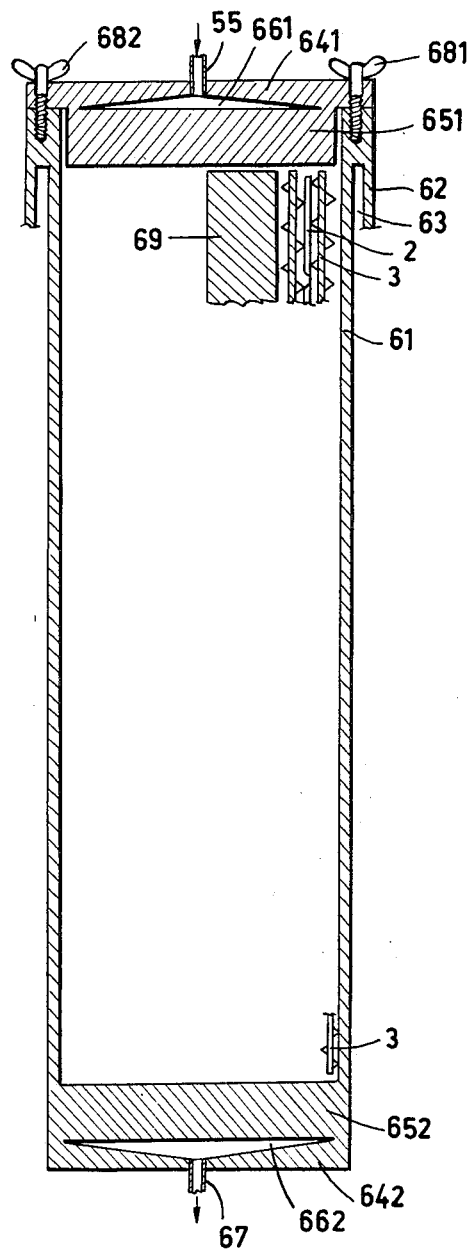
FIGS. 9 and 10 show the wash tank.
Figure 10:
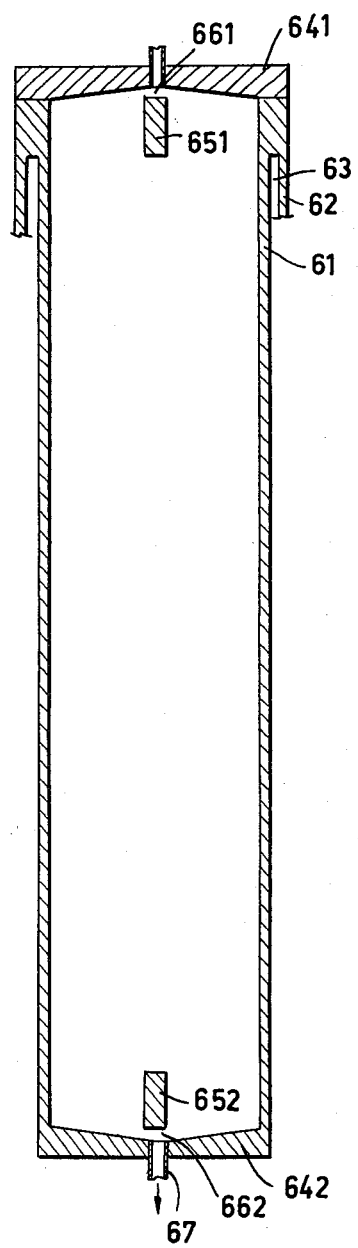

The sample plates 2 and the intermediate plates 3 are stacked upright in a wash tank 6 (FIGS. 9 and 10), in which there is a space 63 for a heat exchange liquid to circulate between a double wall 61 and 62. Beams 652 and 651 in the bottom 642 and cover 641 keep the plates away from the actual bottom and cover plates, which ensures even flow of the wash liquid. For even flow there are beams in the direction of an inlet tube 55 and an oulet tube 67 to divide the liquid flow in the narrow passages 662 and 661. The extra space of the tank is filled with compact plates 69 (that contain consoles) in order to save wash liquids. After this a cover 641 with beams 651 is fixed with wing nuts 681 and 682.

Figure 6:
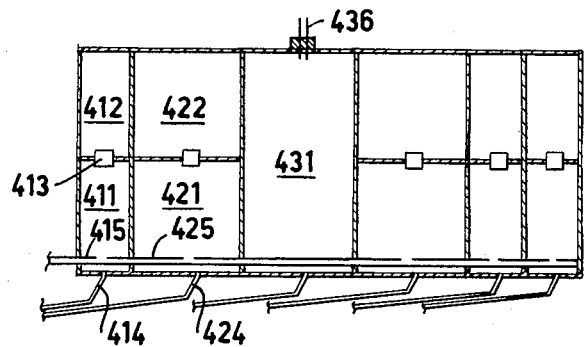
FIG. 6 shows the liquid tank according to the invention.

A liquid tank 4 (FIG. 6) is filled for the washing step with a needed amount of a wash liquid. In the beginning of the run an increasing density gradient can be used and at the end a decreasing one. For example, ethanol may be put into tank 411 and 5% trichloro acetic acid in water into tank 412. When liquid is taken from the tank 411 by a tube 414, there comes heavier liquid from the tank 412 as valve 413 is opened. Air bubbles into tank 411 from an air bubbler mixer 415 and the liquid in the tank 411 is mixed whereby the density of the liquid it contains rises continuously. A valve 5 (FIGS. 7 and 8) governs the liquid inlet so that liquid is taken from one pair of vessels at a time. In the valve on the outside of a plate 59 there is a dividing plate 51, the passages of which are fed via the liquid tubes 414, 424, etc. Inside the dividing plate there is a rotating component 52, which contains a passage 522 and when it meets the passage in the dividing plate itself liquid can flow. In the beginning of the run the passage 414 of the dividing plate is taken into use by turning a knob 521 counterclockwise until a limiter 54 is reached, after which time a spring 525 turns the cock clockwise until a bolt 572 of a relay 571 stops the movement at the same time, when it contacts a tooth 531 of a gear wheel 53 which is firmly mounted on the component 52. After the vessel pair 411/412 is empty the contact is lost with contact wires 561 and 562 that are coupled parallel in the tube 55, at which a part 12 of a control unit (FIG. 1) sets the relay 571 and releases a relay 581. This makes the cock rotate until a bolt 582 contacts a tooth 535, where the movement stops and liquid begins to flow from the following pair of vessels 421/422 along the tube 424, which again means that contact is made and the relay 581 of the cock sets and 571 releases, whereas the cock rotates a little distance until a tooth 532 is stopped by the bolt 572. In this way each vessel is emptied in turn until the last vessel is emptied and the cock is stopped by the limiter 54.

From the cock liquid goes to a pump until 601 and from there to a thermostat 602 (FIG. 1), which heats also the wash tank. The tank is filled up-side-down with an increasing density gradient and after that with liquid that has a constant concentration from a vessel 431, in which e.g. salt has been added into trichloroacetic acid to increase the specific gravity. When the liquid in the vessel 431 is emptied therefrom, contact is lost with a wire 436 and a control unit 11 releases a bolt 691 that holds the tank and the tank 6 rotates 180° drawn by a spring 692, after which the tank is fed from above with liquid, the density gradient of which is decreasing, until all the wash solutions have been used. The control unit 11 couples also on the end sensing unit 7 (FIG. 1) which notes when all the wash liquid has flowed through the tank 6, whereas there is no more liquid coming from the tube 67. The sensing unit 7 can be made of a thermistor, which is heated. The heat is dissipated as long as liquid is flowing in tube 67, but the temperature of the thermistor is rising as soon as air is flowing in tube 67, so the resistance of the themistor is changed. This results (through a unit 13) in stopping the air bubbling (through magnetic valve 499) and the pump and the thermostat are uncoupled and a magnetic valve 604 is opened so that air from an over-pressure tube 603 for drying is let through the vessel. At the same time it starts a clock 15 which after a given time uncouples the whole apparatus from electricity network 14.

The wash liquids of each sample mix in this apparatus and are drained through a tube 77 (drain 8). Despite the fact that the wash solutions come into contact with the following samples no changes of the wash efficiency have been observed between the first and the last samples coming into contact with the liquid. Experiments in which pieces of chromatography paper measuring 4 x 7 cm. were used as the absorbing material have proved that in conditions simulating protein synthesis whereby the synthesis was, however, prevented, less than 0.01% of the amino acid to be washed remained unwashed by a sample size of 0.25 ml. The amino acid transfer RNA complex remained in the paper during the wash to 100%.

It is obvious that the form of the apparatus as described can be different from what is explained above without departing from the spirit and scope of the invention.

I claim:

1. In a method for the automatic and simultaneous separation of undesired substances from at least one sample composition which is to be analyzed comprising absorbing the desired components of the sample composition into an absorbent medium and washing away the undesired components, the improvement comprising arranging a plurality of absorbent medium plates, into which said sample compositions have been absorbed, in a washing tank separated from the adjacent plates by intermediate elements to form spaces between adjacent plates through which a liquid may flow and contact said plates; rinsing said plates in said wash tank with a wash liquid whereby said undesired substances are dissolved in said wash liquid, the flow of said wash liquid through said wash tank being adjusted to a constant value by altering the density of said wash liquid; removing any remaining wash liquid from said wash tank by blowing air therethrough; and removing from the tank the dry absorbent medium plates containing said components absorbed therein.

2. The method of claim 1 wherein a first wash liquid is fed into the bottom of said wash tank, the density of said first wash liquid increasing from a relatively lower density to a relatively higher density whereby said wash liquid flows upwardly through and out of said wash tank; wherein said wash tank is then filled with a heavy liquid having a constant density and rotated 180°; and wherein a second wash liquid is subsequently fed into the top of the rotated wash tank, the density of said second wash liquid decreasing from a relatively higher density to a relatively lower density whereby said second wash liquid flows downwardly in and out of said wash tank.

3. The method of claim 1 wherein a macromolecular substance reaction mixture is absorbed into said absorbent medium plates, wherein the macromolecules selected from the group consisting of proteins, nucleic acids and an amino acid-transfer ribonucleic acid complex are precipitated in said absorbent medium plates with an acid and wherein the undesired micromolecular substances remain soluble and are washed out of said absorbent medium plates by said wash liquid.

4. The method of claim 1 wherein a blood serum sample is first mixed with radioactive iron and absorbed into said absorbent medium plates which comprise paper containing magnesium carbonate; whereby the radioactive iron which becomes bonded to the protein contained in said sample is subsequently removed by washing with a solution of water and a salt; and wherein the amount of the non-bonded iron remaining in said paper is measured to determine the iron bonding capacity of said blood serum sample.

5. An apparatus useful for the separation of undesired substances from at least one sample composition which is to be analyzed comprising:
   absorbent plates capable of absorbing said sample composition;
   a wash tank containing a plurality of said absorbent plates, said plates being separated form each other in said wash tank by intermediate non-absorbent elements forming a space between said absorbent plates through which a liquid may flow and contact said absorbent plates wherein the undesired components of said sample composition are dissolved in said liquid which contacts said plates;
   means to introduce a wash liquid into said wash tank;
   means to vary the density of said wash liquid to insure a constant flow of wash liquid into and through said wash tank; and
   means to remove said wash liquid containing said undesired components dissolved threin from said wash tank, leaving only the desired components of said sample compositions absorbed in said absorbent plates.

6. The apparatus of claim 5 wherein said absorbent plates comprise a plurality of areas capable of absorbing the desired substances of said said sample composition, said areas being separated from each other by a means which is not capable of absorbing said desired substances and which is not capable of absorbing liquid.

7. The apparatus of claim 6, wherein said areas capable of absorbing said desired substances comprise a spongy central portion capable of absorbing liquid and a relatively higher density surface to prevent the absorbent desired substances from escaping from said areas after absorption.

8. The apparatus of claim 5 wherein said means to introduce a wash liquid into said wash tank and said means to vary the density of said wash liquid comprise a separate liquid tank containing a plurality of separate vessels adapted to contain a plurality of different wash liquids and having means to regulate the mixture of said different wash liquids being fed to said wash tank to regulate the density thereof.

9. The apparatus of claim 8 wherein said separate vessels are separated by a valve and wherein means for introducing air into the lowermost vessel is provided whereby when said valve is opened, a heavier wash liquid descends from the uppermost vessel into the lowermost vessel and wherein the rising air bubbles from said means for introducing air therein mixes the wash liquid contained in said lowermost vessel wherein the density of the mixed liquid continuously increases due to increased amounts of said heavier wash liquid entering said lowermost vessel.

10. The apparatus of claim 9 wherein a plurality of said uppermost and lowermost vessels are provided and wherein automatic conrol means is provided to introduce said different wash liquids from said separate sets of uppermost and lowermost vessels into said wash tank when the wash liquids in one set of uppermost and lowermost vessels is exhausted.

11. The apparatus of claim 9 further comprising means to rotate said wash tank 180° after said wash liquid of increasing density has flowed therethrough and means for then introducing into the rotated wash tank a wash liquid of decreasing density.

References Cited

UNITED STATES PATENTS

| | | | |
|---|---|---|---|
| 1,456,102 | 5/1923 | Folger | 23—259 |
| 1,722,435 | 7/1929 | Leiboff | 23—259 |
| 1,762,738 | 6/1930 | Petrey | 23—259 |
| 3,202,188 | 8/1965 | Allington | 23—259 UX |
| 3,480,400 | 11/1969 | Csijmas et al. | 23—259 |
| 3,275,416 | 9/1966 | Zaar et al. | 23—230 B |
| 3,419,051 | 12/1968 | Gustafson et al. | 23—253 R X |
| 3,471,062 | 10/1969 | Buchler | 23—267 C X |
| 3,507,618 | 4/1970 | Murty et al. | 23—230 B |

JOSEPH SCOVRONEK, Primary Examiner

U.S. Cl. X.R.

23—230 B, 253 R, 259; 210—24, 70, 198 R